Dec. 16, 1947.  H. WARMAN  2,432,704
APPARATUS FOR PROJECTION VIEWING AND PRINTING FROM TRANSPARENCIES
Filed July 10, 1946  2 Sheets-Sheet 1

Horace Warman
Inventor
by his attorneys
Stebbins, Blenko & Webb

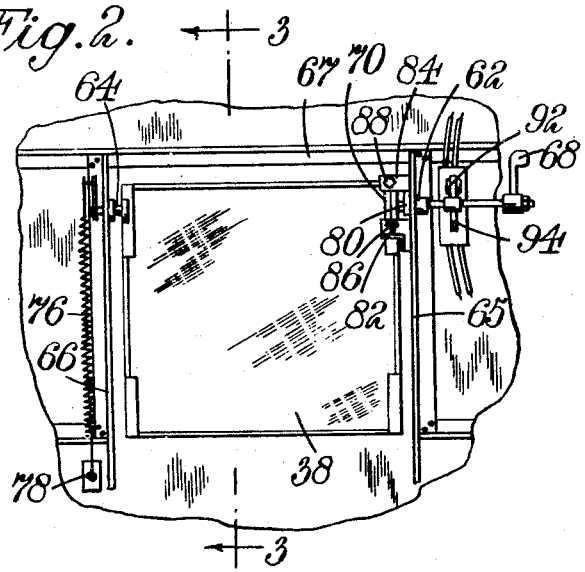
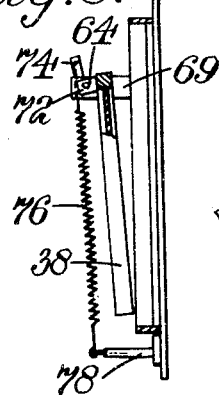
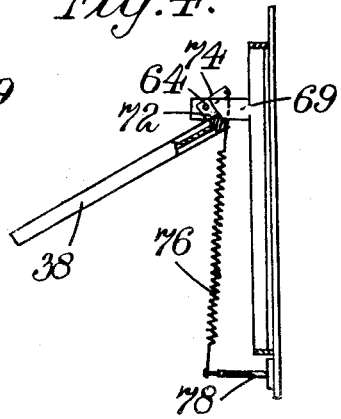

Patented Dec. 16, 1947

2,432,704

UNITED STATES PATENT OFFICE 2,432,704

APPARATUS FOR PROJECTION VIEWING AND PRINTING FROM TRANSPARENCIES

Horace Warman, London, England, assignor to Pictorial Machinery Limited, London, England, a British company Application July 10, 1946, Serial No. 682,678
In Great Britain May 29, 1945

8 Claims. (Cl. 88—24)

This invention relates to apparatus for viewing and printing from transparencies, such as photographic negatives, of the kind which comprises a vertical cabinet having a window glazed with a transparent sheet, a translucent screen mounted outside the cabinet for movement from a position in which it closely overlies the transparent sheet to one in which it is clear of the window, and an optical system comprising a source of light and a lens arranged to provide a beam of light within the cabinet for projecting an image of a transparency (hereinafter referred to as a "cut" transparency) on to the plane of the outer surface of the transparent sheet, which optical system is arranged to reflect the light from its source one or more times within the cabinet before it reaches the transparent screen, and thereby provide a bent light path that has between the lens and the screen a greater length than the straight-line distance between the same.

This optical system may provide a zigzag light path that extends from the source of light to the window and may be bent at both sides of the lens.

This apparatus is very suitable for use with "cut" transparencies in plate form, such as quarterplate photographic negatives, and the main object of the present invention is to provide a so-called "universal" apparatus of the kind described which can be readily used selectively at will either with "cut" transparencies in plate form, such as cut photographic negatives, or with other transparencies in the form of films.

According to the present invention there is provided apparatus of the kind described above for printing from and viewing cut transparencies, wherein traversing means is provided for traversing a transparency in the form of a film in a gate situated at the upper part of the cabinet at a level above the glazed window provided with the display screen, two sources of light are provided, one allotted to each transparency, control means is arranged to energise the sources of light selectively at will, and the optical system comprises adjustable means movable selectively into two positions according to which source of light is energised, in one of which positions it projects the projection beam from the "cut" transparency on to the screen, and in the other of which it projects the projection beam from the film on to the screen.

The adjustable means may comprise a mirror pivotally mounted in the cabinet for use selectively in the two said positions. Two stops are preferably arranged to limit the angular movement of the mirror about its axis of pivoting.

Change-over means is preferably arranged to control the sources of light and the movement of adjustable means simultaneously.

Conveniently the sources of light are constituted by electric lamps, and the change-over means comprises a two-position switch for controlling the circuit connections of the lamps, and a manual control member arranged to operate the switch and simultaneously to rock the mirror.

Preferably the manual control member carries an angle lever arranged to actuate the switch, which control member is operatively connected by lever mechanism with the mirror.

The nature of the invention, and the manner in which it is to be performed will now be described by way of example, and not by way of limitation, with reference to one embodiment of the invention, illustrated diagrammatically in the accompanying drawings wherein—

Figure 2 is a front elevation of the adjustable mirror and change-over means for moving it; and Figures 3 and 4 are vertical sectional elevations thereof, showing the mirror in its lower and raised positions respectively, Figure 3 being taken on the line 3—3 in Figure 2.

Like reference characters designate like parts throughout the several views.

Figure 1:
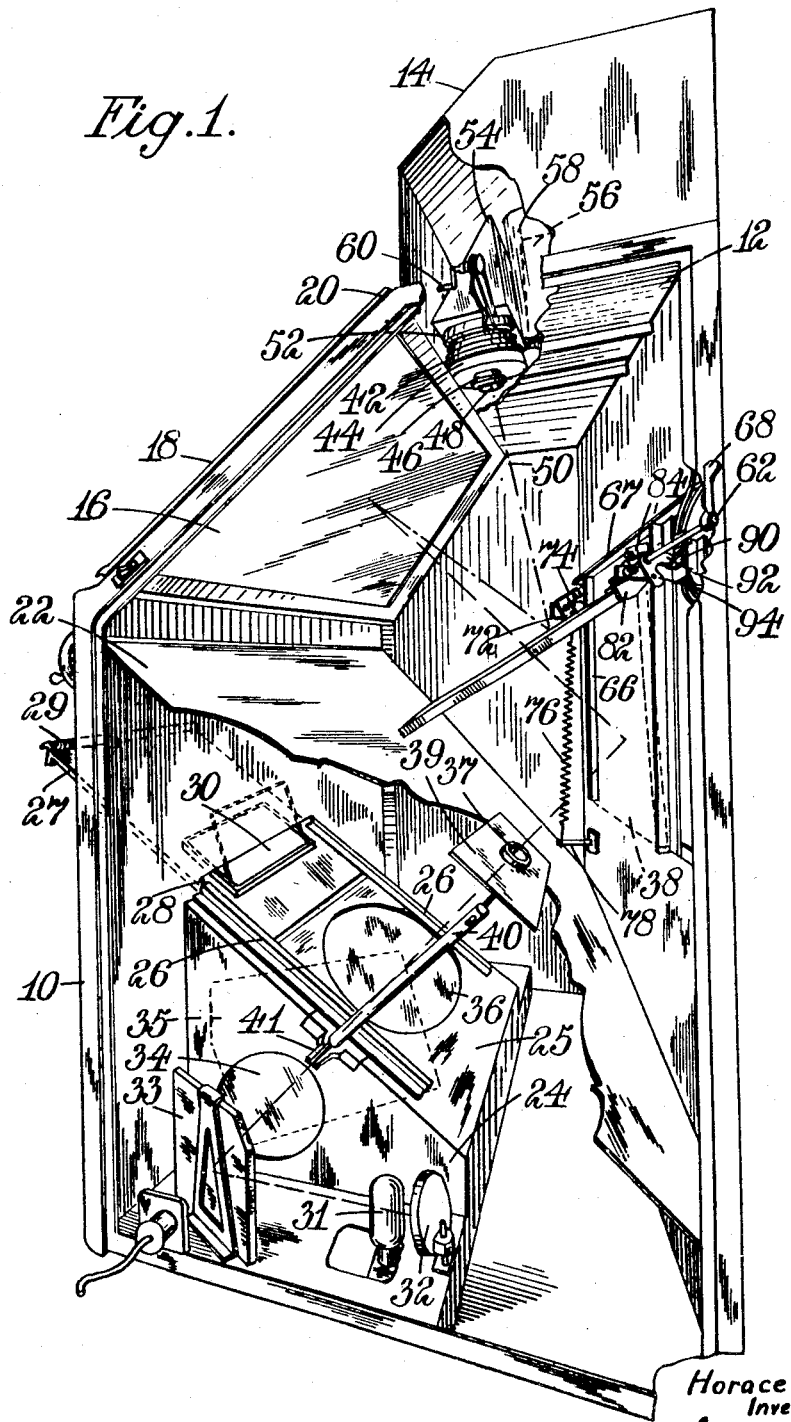
Figure 1 is a perspective view of one construction of "universal" viewing and printing apparatus, according to the invention shown partly broken away.

Referring to the drawing, a "universal" apparatus of the kind described for viewing selectively a transparency in plate form, hereinafter referred to as a "cut" transparency, or a transparency in the form of a length of film that is wound on a feed spool and a take-up spool, comprises a vertical cabinet 10 having a flat top wall 12 carrying a canopy or hood 14. The cabinet has at the front below the canopy a forwardly sloping window 16 glazed with a sheet of clear glass. A translucent screen 18 of ground glass or other suitable material, is hinged at 20 along the upper edge of the window so that it can be raised clear of the latter or can be lowered closely to overlie the glass in the window.

The cabinet is divided into an upper and lower compartment by a partition 22, which slopes down rearwardly from just below the window 16. A part of this partition is shown broken away to show the parts beneath it. A box 24 is provided on the floor and extending upwards against the front wall of the cabinet, the top 25 of which box slopes down to the rear, and carries a slanting guideway comprising slanting guide rails 26, in which a frame 27 slides. The end of the frame 27 projects through an aperture in the form of a slot 28 in the front of the cabinet, and carries a part 29 which serves both to close the slot 28 when the frame is pushed fully into the cabinet, and as a finger grip to allow the frame to be pulled out. A copy holder 30, hereinafter referred to as a negative holder, is carried by the frame 27 to support a negative or other copy in the form of a "cut" transparency in the correct position in an optical projecting system in the cabinet, which negative holder may be of any convenient form.

The optical system comprises an electric lamp 31 and concave mirror 32 which project light on to a mirror 33, which in turn reflects the light through a condenser 34 in one side wall of the box 24 on to a mirror 35 within the box. The mirror 35 reflects the light through a second condenser 36 which concentrates the light on to a lens 37 supported above an opening, not shown, in the partition 22. The light passing through the lens is reflected by a mirror 38 through the window 16, the light path being zig-zag and bent at opposite sides of the lens. When the frame 27 is fully inserted into the cabinet, the negative holder overlies and registers with the condenser 36 so that the lens 37 will form an enlarged image of the negative in the plane of the upper surface of the window 16. The lens is carried by a plate 39 which is supported by a rod 40. This rod passes through and fits slidingly in a hole, not shown, in the partition 22, and is secured at its lower end in a clamp 41. This allows of the lens being adjusted to focus the image.

The plate 39 acts as a light trap to exclude from the upper compartment any light falling on the opening in the partition 22 either directly from the lamp 31, or by reflection from the mirror 33. Since the lens is spaced away from the opening in the partition 22, and the lamp 31 and the mirror 33 are situated to one side of the axis of the lens and opening, light from either of these sources that passes through the opening will fall on the plate 39 at the other side of the lens and will not pass through the lens. The box 24 serves to shield the mirror 35 and the negative from the lamp 31. The whole of the interior of the cabinet is finished matt black to reduce the reflection of light to a minimum in the usual way. It will be seen that the optical system provides a long zigzag light-path in a confined space with proper light-shielding.

A negative inserted into the cabinet can be viewed on the translucent screen 18 by lowering it over the window 16 as shown, the lamp being switched on. To print from the negative, the screen 18 is raised and a sheet of sensitised paper is placed on the window 16, after which the screen is lowered to hold the paper in place. The lamp 31 is then switched on by its switch for the proper length of time to effect the printing.

The mirror 38 is adjustable as described hereinafter, and a rotatable head of known construction comprising traversing means having a feed spool and a take-up spool for the film is accommodated in the canopy or hood on the top of the cabinet. This head comprises a base plate 42 that is seated on the rim of a cup-shaped support or bearing 44 secured to the top wall 12. The bottom wall of the bearing member 34 is apertured and carries a vertical tube 46, in which is accommodated a projection lens 48 of a second optical system, whereof the principal optical axis lies as 50. The head also comprises a condensing lens at 52, and a prism 54 above the latter, a source of light 56, preferably an electric lamp bulb, being accommodated in a vertical casing 58 adjacent to the prism. This rotatable head, which forms a unitary structure, also carries traversing means comprising a feed spool and a take-up spool for traversing a film across the light path in the head, a cranked handle-member for traversing the film being shown at 60.

The said mirror 38 has two stub shafts 62 and 64 by which it is journalled in side members 65, 66 of a frame having a top member 67 so that the mirror can rock about a horizontal axis situated near its upper end. This mirror 38 constitutes adjustable means that is selectively movable by a crank-handle 68 on the shaft 62, into two positions according to which source of light 31 or 56 is energised, in one of which positions indicated in broken lines, in Figure 1 and in full l'nes in Figures 2 and 3, it projects the projection beam from the "cut" transparency on to the screen 18, and in the other of which, shown in full lines in Figures 1 and 4, it projects the projection beam from the film on to the screen.

The shaft 64 is also supported in a bearing bracket 69. The mirror 38 has two supporting arms 70 and 72 carried by the stub shafts 62 and 64 respectively. The arm 72 forms part of a bell-crank 72, 74, to the arm 74 of which is attached one end of a spring 76, whereof the other end is anchored below the mirror to a bracket 78. An angle bracket 80 is fixed on the frame member 65 and has two arms 82 and 84 which lie at an acute angle one to the other, and respectively carry set-screws 86 and 88, against which the side of the mirror bears in its lower and raised positions, respectively, whereby the angular movement of the mirror 38 is limited. As is apparent from Figures 3 and 4, the upper end portion of the spring 76 moves from one side of the dead centre position of the arm 74 to the opposite side during the movement of the mirror from one extreme position thereof to the other, so that the mirror tends to remain in that position into which it is moved by the described change-over means.

In order that the illumination of the two lamps 31 and 56 shall be changed automatically when a change is made from projecting one transparency to the other, a two-position or change-over switch 90 operable by a U-shaped member having two arms 92 and 94 constituting part of the change-over means for the mirror 31, which switch is arranged to control the circuit connections of the two lamps. The member 92, 94 is fast on the shaft 62 that carries the handle member 68 situated outside the cabinet, the arrangement being such that when the handle member 68 is rocked to light one of the electric lamps, an image of the "cut" film or of the roll film is thrown on to the screen 18 according to which lamp is illuminated.

I claim:

1. Apparatus for viewing and printing from transparencies comprising a vertical cabinet having a side window, glazed with a transparent sheet, a display screen pivotally mounted on the outside of the cabinet for movement from a position in which it overlies the transparency to a position in which it is clear thereof, an optical system within the cabinet comprising a source of light and a lens arranged to project an image of a "cut" transparency through the transparent sheet on to the screen, said system comprising reflectors and condensers arranged to reflect the projection beam at least once within the cabinet between the projection lens and the transparent sheet, its length being thus greater than the straight-line distance between the same, a film gate carried by the cabinet at the upper part thereof at a level above the glazed window, traversing means located above said gate for traversing a transparency in the form of a film through the gate, a second source of light adjacent said gate for projecting a beam of light through said transparency and onto said screen, control means arranged to energise the two sources of light selectively at will, one of said reflectors being pivotally mounted on the cabinet for movement selectively into two positions according to which source of light is energised, in one of which positions it projects the projection beam from the "cut" transparency on to the screen, and in the other of which it projects the projection beam from the film on to the screen in substantially the same path relative to the screen and onto the same general screen area.

2. Apparatus for viewing and printing from transparencies comprising a vertical cabinet having at one side a window, glazed with a transparent sheet, a display screen associated therewith, an optical system within the cabinet comprising a source of light and a lens arranged to project an image of a "cut" transparency through the transparent sheet on to the screen means for mounting said display screen outside the cabinet for movement from one position, in which it closely overlies the transparent sheet, to a second in which it is clear of the window, said optical system comprising reflecting members arranged to reflect the projection beam a plurality of times within the cabinet between the projection lens and the transparent sheet, so that the length of the beam is greater than the straight-line distance between the lens and the transparency, a film gate situated at the upper part of the cabinet at a level above the glazed window, traversing means for traversing a transparency in the form of a film, through the gate a source of light allotted to the film transparency for projecting a beam of light through said film and onto said screen, and control means arranged to energise the two sources of light selectively at will, one of said reflecting members being a mirror pivotally mounted in the cabinet for use selectively in two positions according to which source of light is energised, in one of which positions the mirror projects the projection beam from the "cut" transparency on to the screen, and in the second of which positions it projects the projection beam from the film on to the screen in substantially the same path relative to the screen and onto the same general screen area.

3. Apparatus for viewing and printing from transparencies as set forth in claim 2, wherein two stops are arranged to limit the angular movement of the mirror about its axis of pivoting.

4. Apparatus for viewing and printing from transparencies, comprising a vertical cabinet having at one side a window, glazed with a transparent sheet, a display screen associated therewith, an optical system within the cabinet comprising a source of light and a lens arranged to project an image of a "cut" transparency through the transparent sheet on to the screen. means for mounting the display screen outside the cabinet for movement from one position in which it closely overlies the transparent sheet to another position in which it is clear of the window, said optical system comprises reflecting members arranged to reflect the projection beam a plurality of times within the cabinet between the projection lens and the transparent sheet, so that the length of the beam is greater than the straight-line distance between the lens and the transparency, a film gate situated at the upper part of the cabinet at a level above the glazed window, traversing means for traversing a transparency in the form of a film, through the gate, two sources of light allotted one to each transparency, control means is arranged to energise the sources of light selectively at will, one of said reflecting members comprising a mirror pivotally mounted in the cabinet for use selectively in two positions according to which source of light is energised, in one of which positions the mirror projects the projection beam from the "cut" transparency on to the screen, and in the second of which positions it projects the projection beam from the film on to the screen in substantially the same path relative to the screen and onto the same general screen area, and change-over means arranged to control the sources of light and the movement of the movable reflecting member simultaneously.

5. Apparatus as set forth in claim 4, wherein the pivotal mounting for the mirror includes a spring so arranged that it maintains the mirror in either position to which it is moved.

6. Apparatus as set forth in claim 2 wherein the sources of light are constituted by electric lamps, and the sources of light and movement of the pivoted mirror are simultaneously actuated, said actuating means comprises a two-position switch for controlling the circuit connections of the lamps, and a manual control member arranged to operate the switch and simultaneously to rock the mirror.

7. Apparatus for printing from and viewing a transparency comprising a vertical cabinet having a lateral window glazed with a transparent sheet, a display screen mounted outside the cabinet for movement from one position in which it closely overlies the transparent sheet to one in which it is clear of the window, an optical system within the cabinet comprising a source of light, a lens arranged to project an image of a "cut" transparency on the screen, and reflecting members arranged to reflect the projection beam a plurality of times within the cabinet between the projection lens and the transparent sheet, so that the length of the beam is greater than the straight-line distance between the projection lens and the transparent sheet, a film gate situated at the upper part of the cabinet at a level above the glazed window, traversing means arranged to traverse a transparency in the form of a film through said gate, a source of light allotted one to the film transparency, one of which reflecting members is a pivoted mirror mounted in the cabinet and rockable selectively into two positions according to which source of light is energized, in one of which positions it projects the projection beam from the "cut" transparency on to the screen and in the other of which it projects the projection beam from the film transparency on to the screen in substantially the same path relative to the screen and onto the same general screen area, two stops arranged to limit the angular movement of the mirror in both directions about its axis of pivoting, and change-over means including a spring arranged so that it tends to maintain the mirror in either position to which it is moved, said change-over means being arranged to control the sources of light and the rocking movement of the pivoted mirror simultaneously, and includes a two-position switch for controlling the circuit connections of the lamps, and a manual control member arranged to operate the switch and simultaneously rock the mirror.

8. Apparatus for viewing transparencies comprising a vertical cabinet having a window, a display screen associated therewith, an optical system within the cabinet comprising a source of light and a lens arranged to project an image of a "cut" transparency on to the screen, said optical system comprising reflecting members arranged to reflect the projection beam along a bent path within the cabinet between the projection lens and the transparent sheet, a film gate situated at the upper part of the cabinet at a level above the window, traversing means for traversing a transparency in the form of a film through the gate, a source of light allotted to the film transparency, and control means is arranged to energise the two sources of light selectively at will, one of said reflecting members being movably mounted in the cabinet for operation selectively into two positions according to which source of light is energised, in one of which positions it projects the projection beam from the "cut" transparency on to the screen, and in the other of which it projects the projection beam from the film on to the screen in substantially the same path relative to the screen and onto the same general screen area, said control means being arranged to control the sources of light and the movement of said movable reflecting member simultaneously.

HORACE WARMAN.

REFERENCES CITED

The following references are of record in the file of this patent:

UNITED STATES PATENTS

| Number | Name | Date |
|---|---|---|
| 595,541 | Hollen | Dec. 14, 1897 |
| 2,022,903 | Thomas | Dec. 3, 1935 |
| 2,155,248 | Adams et al. | Apr. 18, 1939 |
| 2,195,425 | Roger | Apr. 2, 1940 |
| 2,279,463 | Hopkins | Apr. 14, 1942 |
| 2,307,202 | Eddy | Jan. 5, 1943 |
| 2,332,810 | Place | Oct. 26, 1943 |
| 2,346,074 | Hopkins | Apr. 4, 1944 |